(12) United States Patent
Asaimuthu

(10) Patent No.: US 8,655,793 B2
(45) Date of Patent: Feb. 18, 2014

(54) WEB-BASED RECRUITMENT SYSTEM

(76) Inventor: Pugazendhi Asaimuthu, Sterling, VA (US)

( * ) Notice: Subject to any disclaimer, the term of this patent is extended or adjusted under 35 U.S.C. 154(b) by 206 days.

(21) Appl. No.: 12/983,367

(22) Filed: Jan. 3, 2011

(65) Prior Publication Data

US 2012/0173445 A1    Jul. 5, 2012

(51) Int. Cl.
*G06Q 10/00*    (2012.01)
(52) U.S. Cl.
USPC .......................................................... 705/321
(58) Field of Classification Search
USPC .......................................... 705/321, 319, 322
See application file for complete search history.

(56) References Cited

U.S. PATENT DOCUMENTS

| | | | |
|---|---|---|---|
| 5,823,781 A | 10/1998 | Hitchcock et al. | |
| 6,289,340 B1 | 9/2001 | Puram et al. | |
| 7,149,703 B2 | 12/2006 | Younger | |
| 7,346,535 B2 | 3/2008 | Younger | |
| 7,502,748 B1* | 3/2009 | Baldwin et al. | 705/7.14 |
| 7,555,441 B2 | 6/2009 | Crow et al. | |
| 7,562,059 B2 | 7/2009 | Scarborough et al. | |
| 7,653,567 B2 | 1/2010 | Gorham | |
| 7,805,382 B2* | 9/2010 | Rosen et al. | 705/321 |
| 2003/0050816 A1 | 3/2003 | Givens et al. | |
| 2006/0224404 A1 | 10/2006 | Keusseyan | |
| 2008/0033792 A1 | 2/2008 | Rosner et al. | |
| 2008/0091455 A1 | 4/2008 | Dongara et al. | |
| 2009/0228323 A1 | 9/2009 | Ebrahimian | |
| 2009/0276294 A1 | 11/2009 | Roecker | |
| 2009/0299993 A1 | 12/2009 | Novack | |
| 2010/0094679 A1* | 4/2010 | Diehl et al. | 705/9 |
| 2010/0125475 A1 | 5/2010 | Twyman | |
| 2010/0138474 A1 | 6/2010 | Harkins et al. | |
| 2010/0153288 A1 | 6/2010 | Digiambattista et al. | |
| 2010/0179916 A1 | 7/2010 | Johns et al. | |
| 2011/0161238 A1* | 6/2011 | Fitterer et al. | 705/321 |
| 2011/0178940 A1 | 7/2011 | Kelly et al. | |

OTHER PUBLICATIONS

Kaushik, Manu, Matching aspirations, http://businesstoday.intoday.in, Apr. 14, 2010, (3 pages).

* cited by examiner

*Primary Examiner* — Jamisue A Plucinski
*Assistant Examiner* — Olukayode Alabi
(74) *Attorney, Agent, or Firm* — Welsh Flaxman & Gitler LLC

(57) ABSTRACT

A method and system for facilitating the hiring and recruitment of candidates for a particular position. The system would include information relating to the skill level and expertise of various candidates irrespective of a particular job. The candidates will have their various skills assessed through the use of an anonymous assessor. The assessor would provide the system with a rating of each candidate's various assessed skills. The candidate has the option to have this assessment evaluated by a disinterested third party. A client or employer would access the system for the purpose of receiving a listing of potential candidates, their skill levels as well as assessments. The client will provide the system with a list of potential candidates to the position. The clients would utilize this information to hire a particular candidate.

7 Claims, 8 Drawing Sheets

Candidate Setup and Assessments

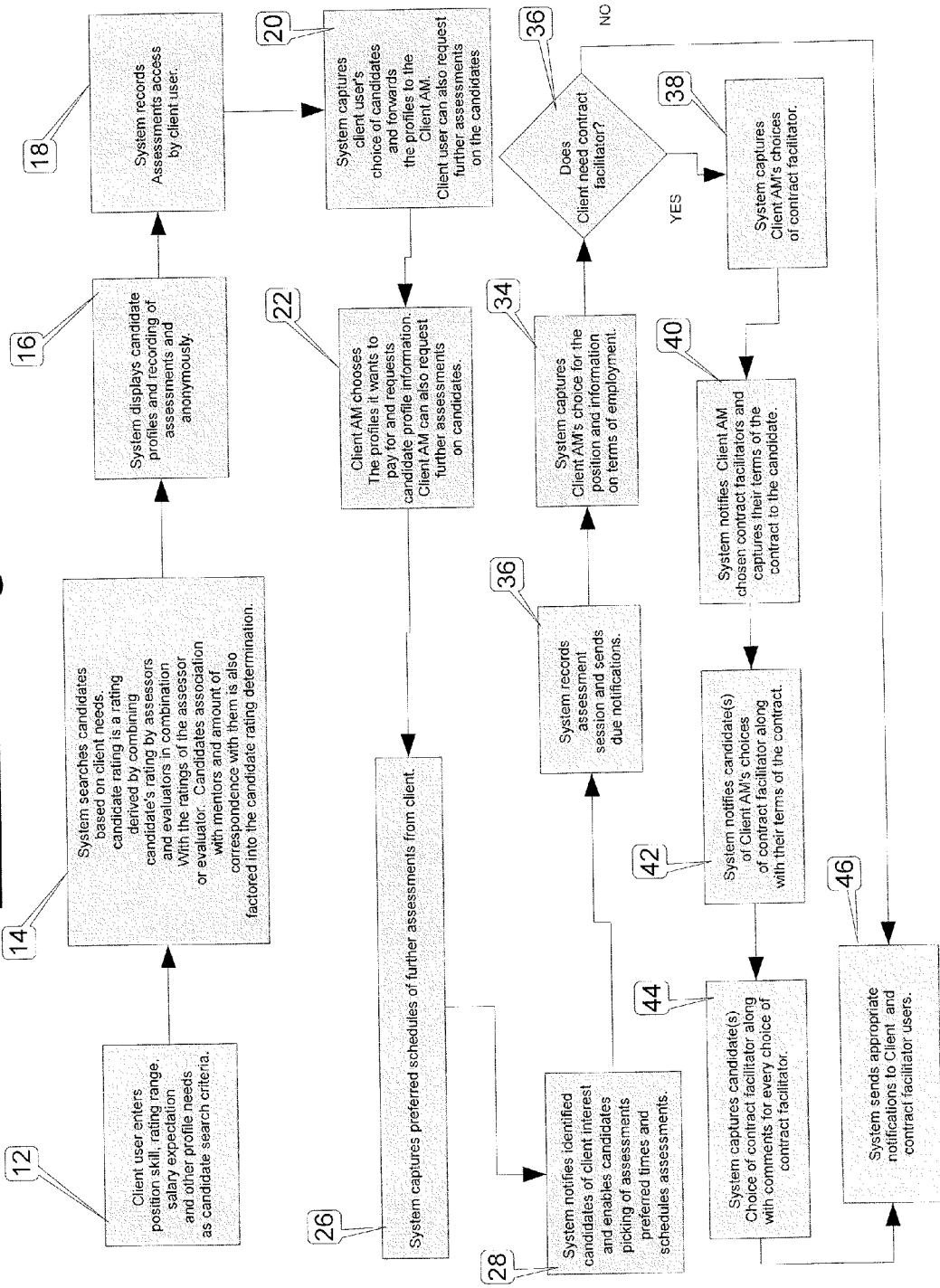
FIG. 1 - Hiring Process

FIG. 2 - Candidate Setup and Assessments
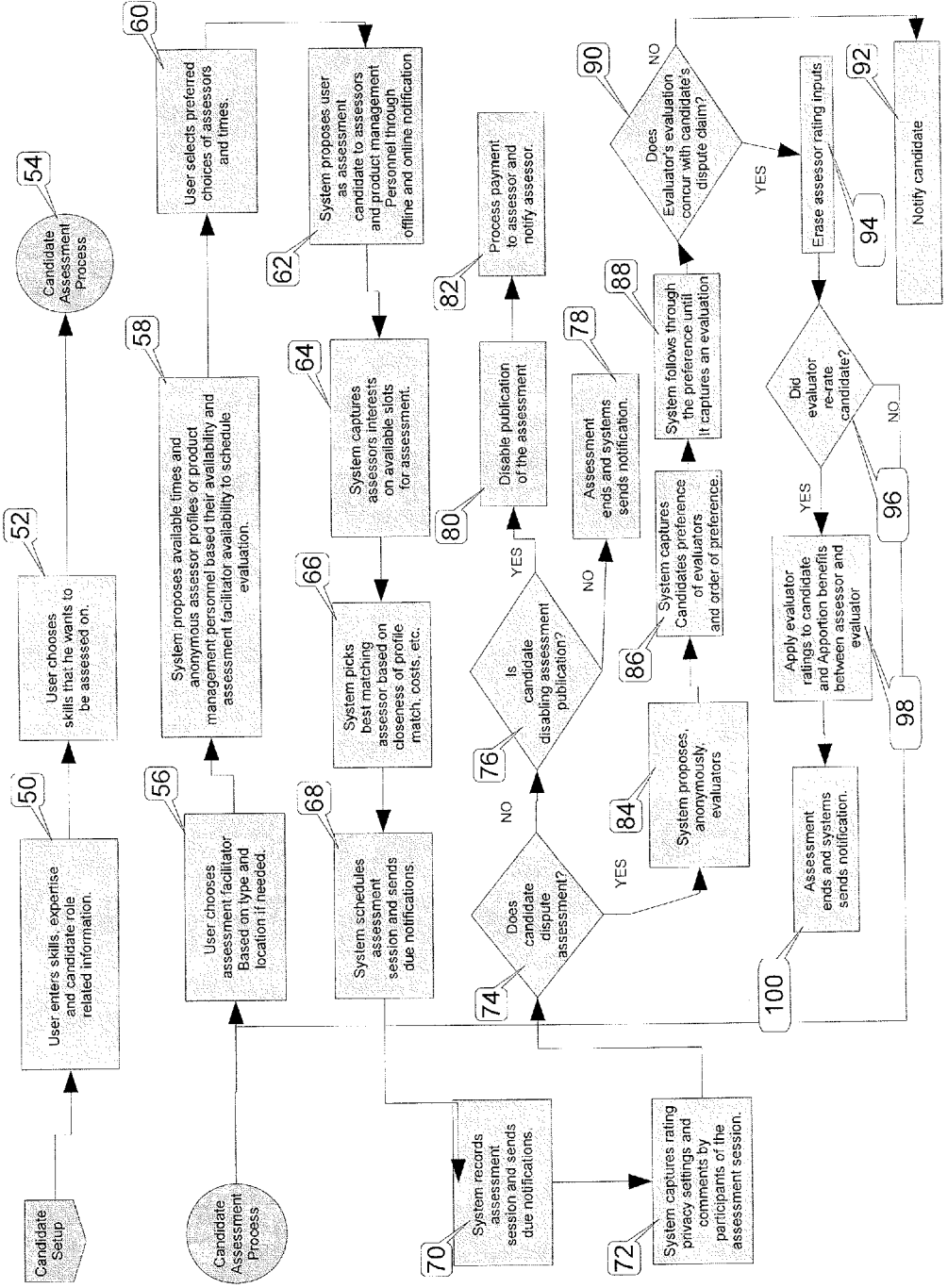

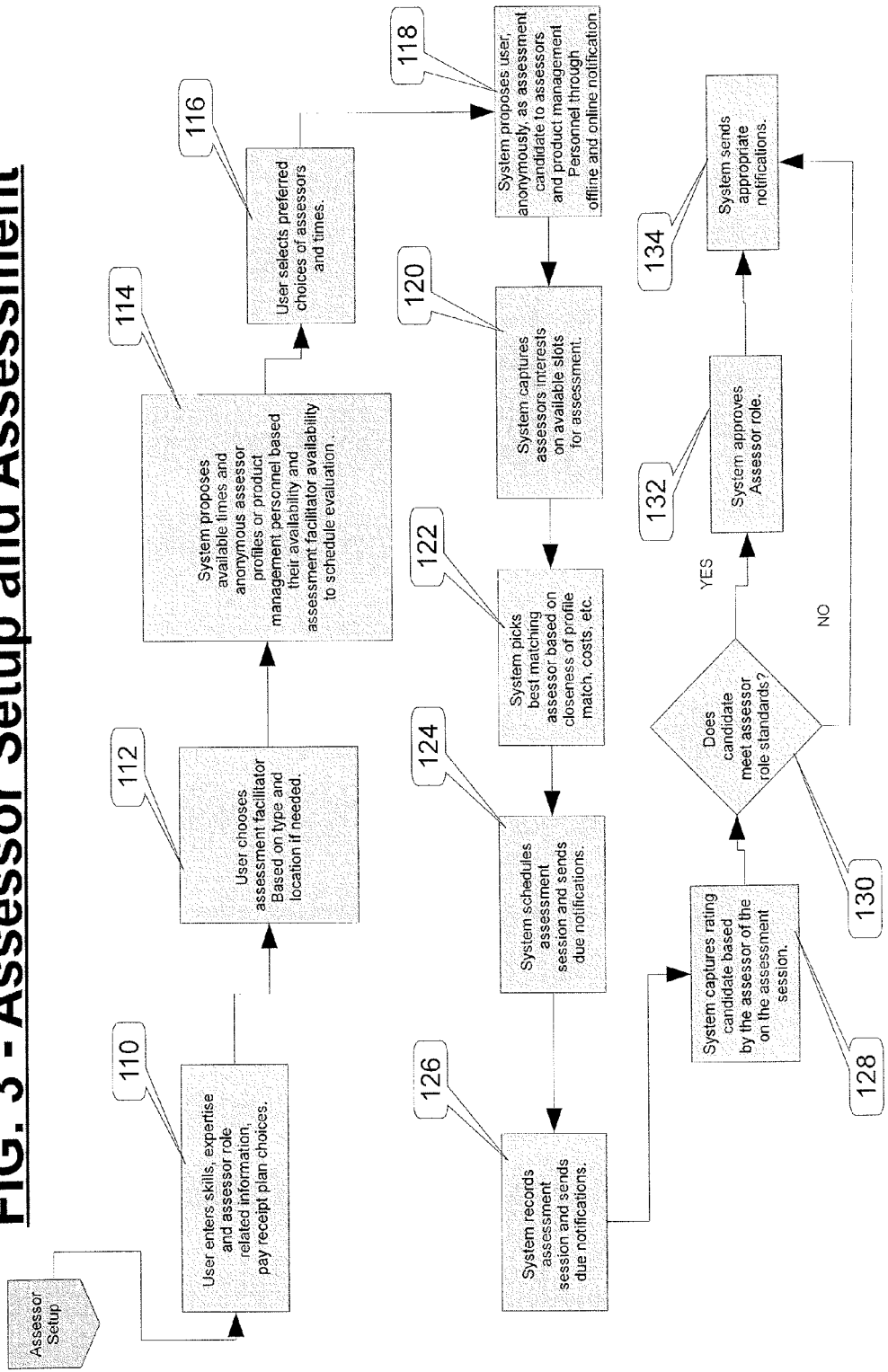
FIG. 3 - Assessor Setup and Assessment

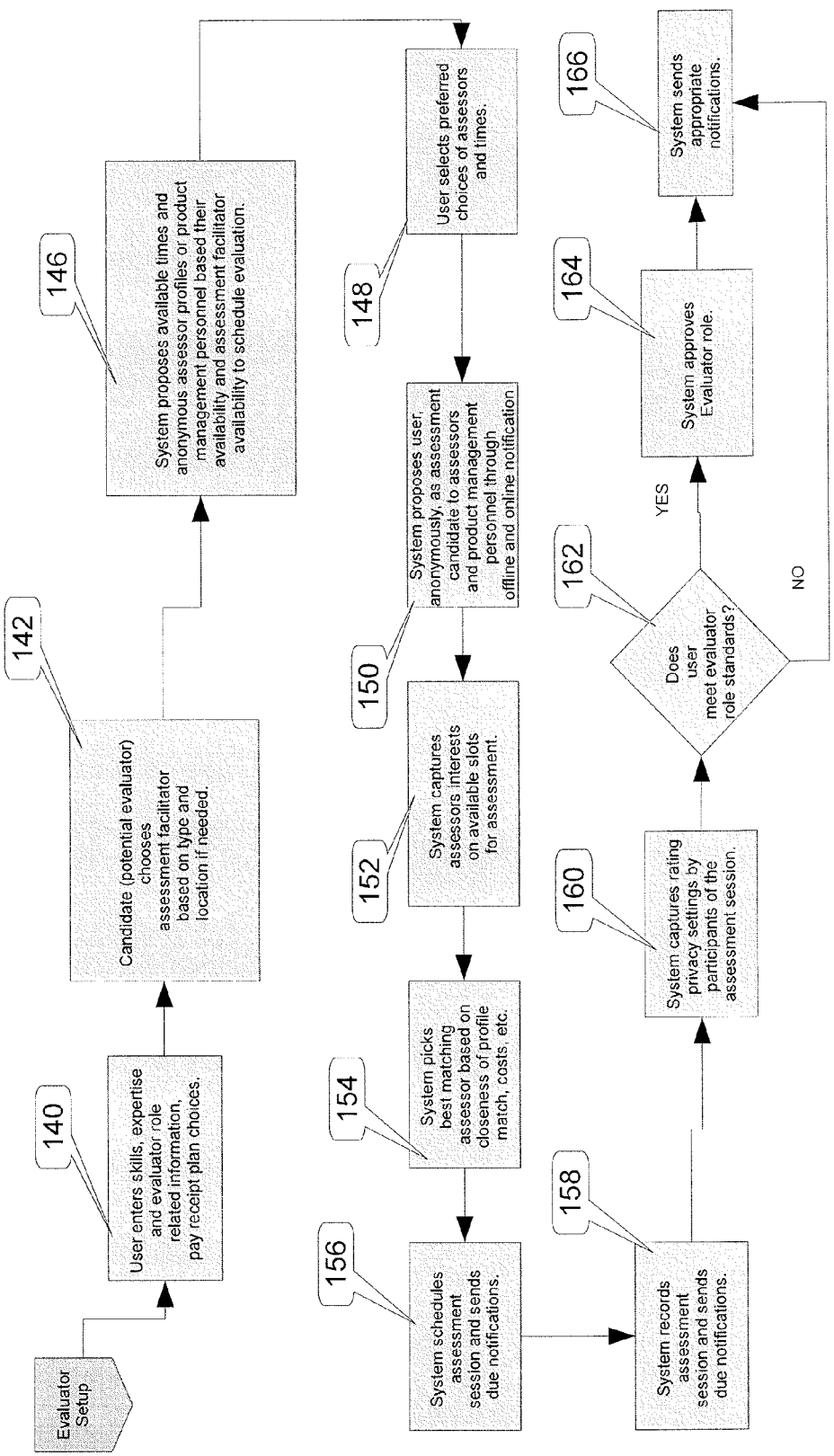
FIG. 4 – Evaluator Setup and Assessment

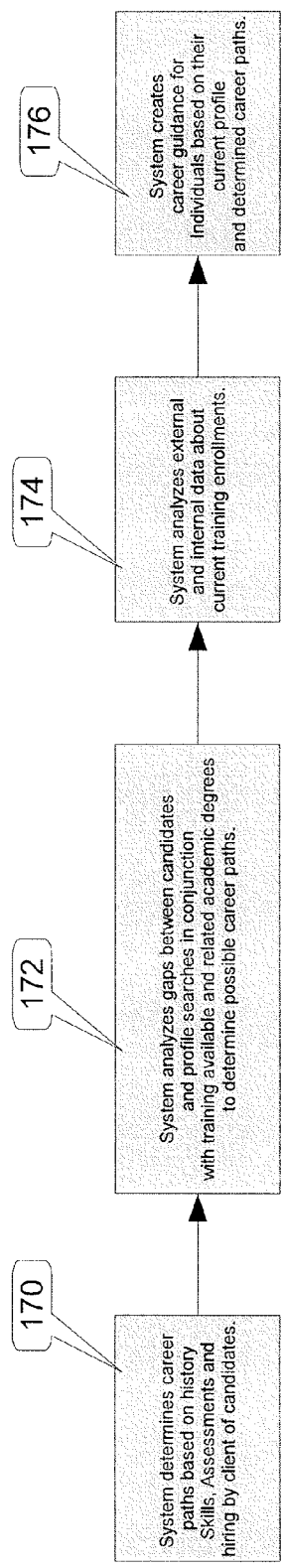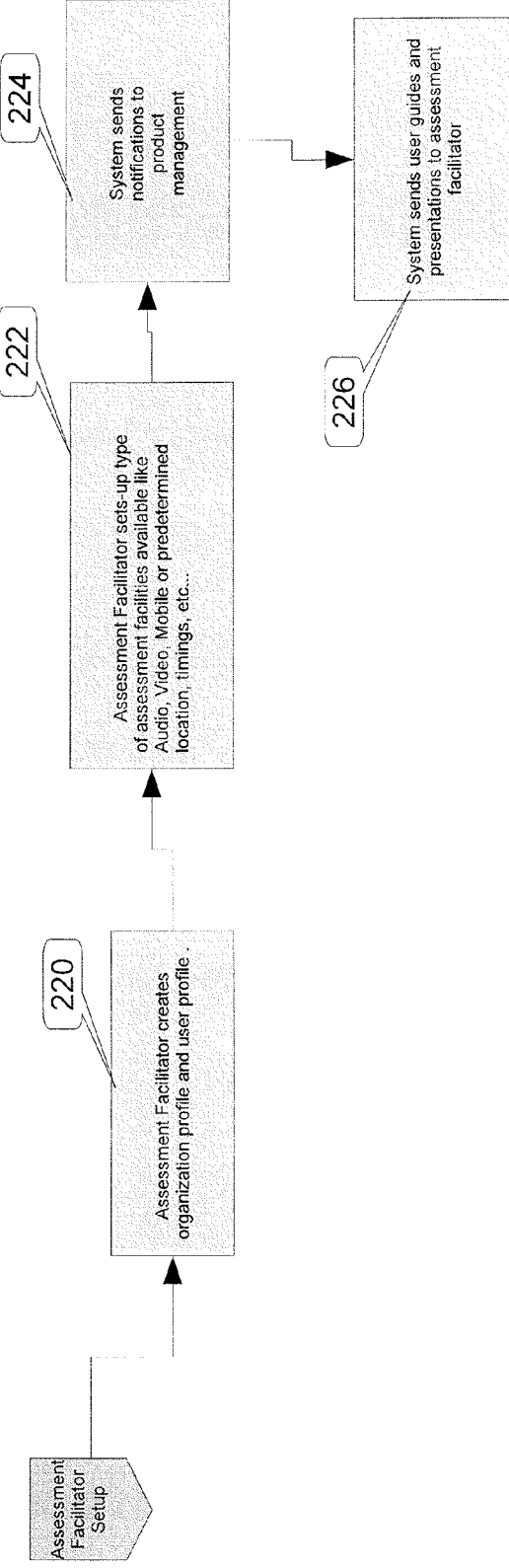

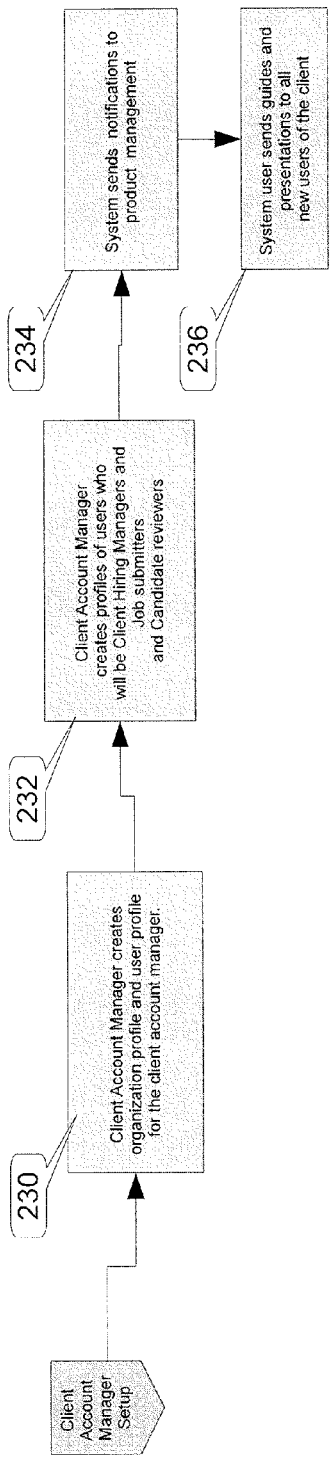
FIG. 9 - Client Account Manager Setup
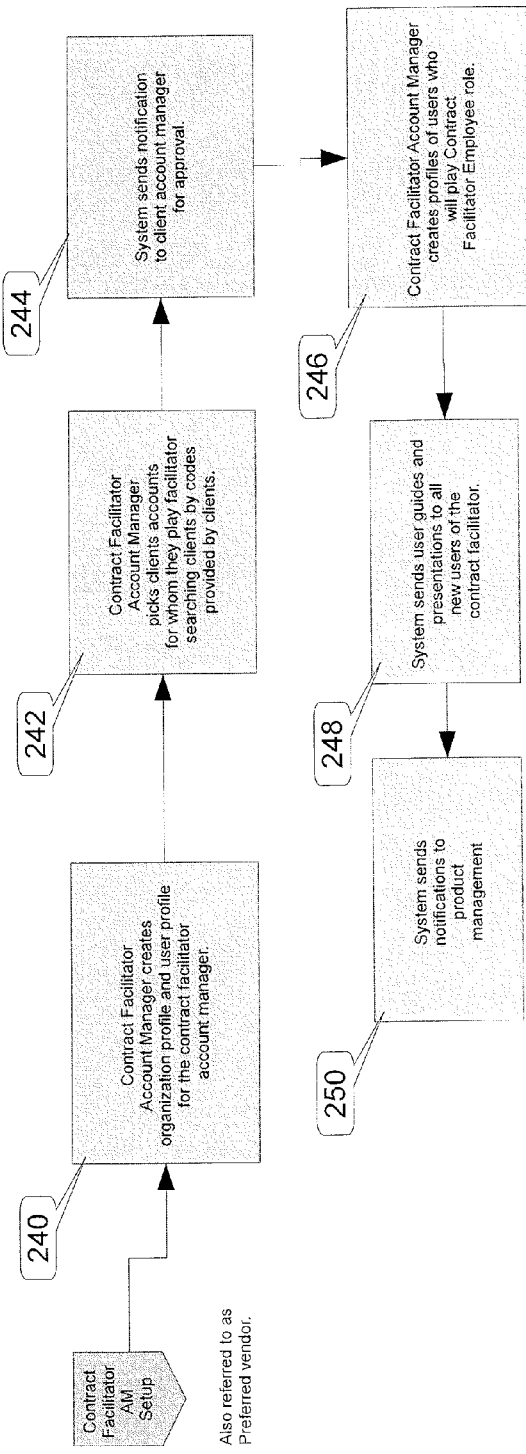
FIG. 10 - Contract Facilitator Account Manager Setup

WEB-BASED RECRUITMENT SYSTEM

FIELD OF THE INVENTION

The present invention is directed to a method and system for assessing the skill level of a candidate as well as providing a list of candidates and their assessments to an employer or client interested in hiring an individual for a position.

BACKGROUND OF THE INVENTION

Historically, recruiting and hiring an individual for a particular position in a company was time consuming and did not necessarily result in the hiring of an appropriate individual for a particular position. If an employer, which is referred to as a client for the purposes of explaining the present invention, wishes to hire an individual for a particular position, such a position would generally be listed, for example, in a number of trade publications or an employment counselor would be hired to provide the client with a list of potential candidates for the position. The client would then be provided with resumes from the employment counselor or directly from the candidates. These resumes would be reviewed and interviews would be conducted by the client to determine the proper candidate for the position. This type of hiring process relies heavily on the client assessing the skills of each of the candidates. Advertising the various positions as well as assessing the candidate's ability to perform the job can be quite expensive and time consuming.

Lately, the utilization of computers and the internet has been employed to shorten and streamline the recruitment process. Various job positions are advertised in one of a plurality of job recruitment websites. A particular candidate would electronically transmit their resume directly to the client for evaluation. Based upon this evaluation, the client would then contact an appropriate candidate or candidates to schedule either a personal interview or employ a teleconference to interview the candidates. Based upon the resume and the interview scheduled between the client and the candidate, a determination would be made as to whether a particular candidate would be offered the position.

Additionally, a number of patent references describe a system utilizing a computerized database as well as the internet to facilitate the hiring process. However, these references are generally job based and do not provide any assessment of the candidate's skill level irrespective of a particular employment position. For example, U.S. Patent Application Publication No. 2003/0050816 to Givens et al. describes a system and method for utilizing a network based computer system for determining whether a particular candidate should be hired for a particular employment. Once a client receives a request from a candidate for the particular job position, a computerized interface component would present to the candidate a predetermined skilled test that is selected based upon the position requested by the candidate. This skill test would then be scored based upon responses made by the candidate, the score then presented to the client. It is important to note that any assessment that the Givens et al. system makes is related to a particular job position and not an overall assessment of the skills of the candidate.

U.S. Pat. No. 7,653,567 to Gorham describes an integrated online job recruitment system including a job database extracting key words from job postings. A query is made by a potential job seeker and a search engine returns its results or gives prominent placement to one or more job postings sponsored by a recruiter. This system requires that the candidate would query the system and not the client. Additionally, no assessment is made regarding the skills of the candidate.

SUMMARY OF THE INVENTION

The deficiencies of the prior art are addressed by the present invention which is directed to a system and method of producing a database capable of being reviewed by a client seeking to hire a candidate for a particular job position. The database would include at least one assessment of the particular skills of a candidate. This assessment would not be job based, but would be prepared by an assessor based upon particular skills presented by the candidate either after the candidate is interviewed by the assessor, or based on other artifacts like a white paper presented by the candidate for assessment. This assessment is then reviewed by the candidate who has the option of having an evaluator review the assessment. This system would give each candidate the opportunity of improving his or her skill levels based upon the assessor's assessment as well as the evaluator's evaluation of that assessment. The candidates would then endeavor to improve their skills in many different ways, such as to take various courses or to be mentored by a mentor. Once the candidate believes that his or her skills have been improved, another assessment may be requested by the candidate. If this new assessment was for the same skill or skill set originally assessed, and if the candidate agrees with this new assessment, it would be substituted for the old assessment. It is important to note that the present system is not job based and each of the candidates applies to be included in the system irrespective of any particular position of employment.

A client who wishes to utilize the system would then enter certain criteria into the system. The criteria would be searched and a list of candidates would be provided to the client, along with the ratings by the assessor or evaluator. The client would then review this list of candidates and may arrange to interview any of the candidates of interest within the system. If the client is then satisfied with at least one of the candidates, contact information of the candidates can be provided by the system.

The system and method of the present invention would significantly reduce the cost and time it takes for hiring the appropriate individual while insuring a much better quality in the assessment of the candidates. The client does have the ability to see all the facts and factors that lead to the selection or rejection of candidates if hiring managers are employed. This system employs data within the system or sources outside the system and guides candidates on a potential career path with significant relevance to current market realities. Therefore, the candidate would be apprised of its position for potential opportunities and helps the candidate work toward qualifying himself or herself better for these opportunities.

These and still other features and advantages of the present invention will be apparent from the description of the following preferred embodiment.

BRIEF DESCRIPTION OF THE DRAWINGS

The present invention is described in further detail below with the aid of example embodiments with reference to the attached drawings, in which are shown:

FIG. 1 a flow diagram showing the hiring process according to the present invention;

FIG. 2 is a flow diagram showing a process for candidate assessment;

FIG. 3 is a block diagram showing the assessment process;

FIG. 4 is a flow diagram showing the evaluation process;

FIG. 5 is a block diagram showing the use of the system and process of the present invention to assist in career guidance for a candidate;

FIG. 8 is a block diagram showing the use of the assessment facilitator in more detail;

FIG. 9 is a block diagram showing the use of the client manager in more detail; and FIG. 10 is a block diagram showing the use of the contract facilitator in more detail.

DETAILED DESCRIPTION OF THE INVENTION

Figure 6:
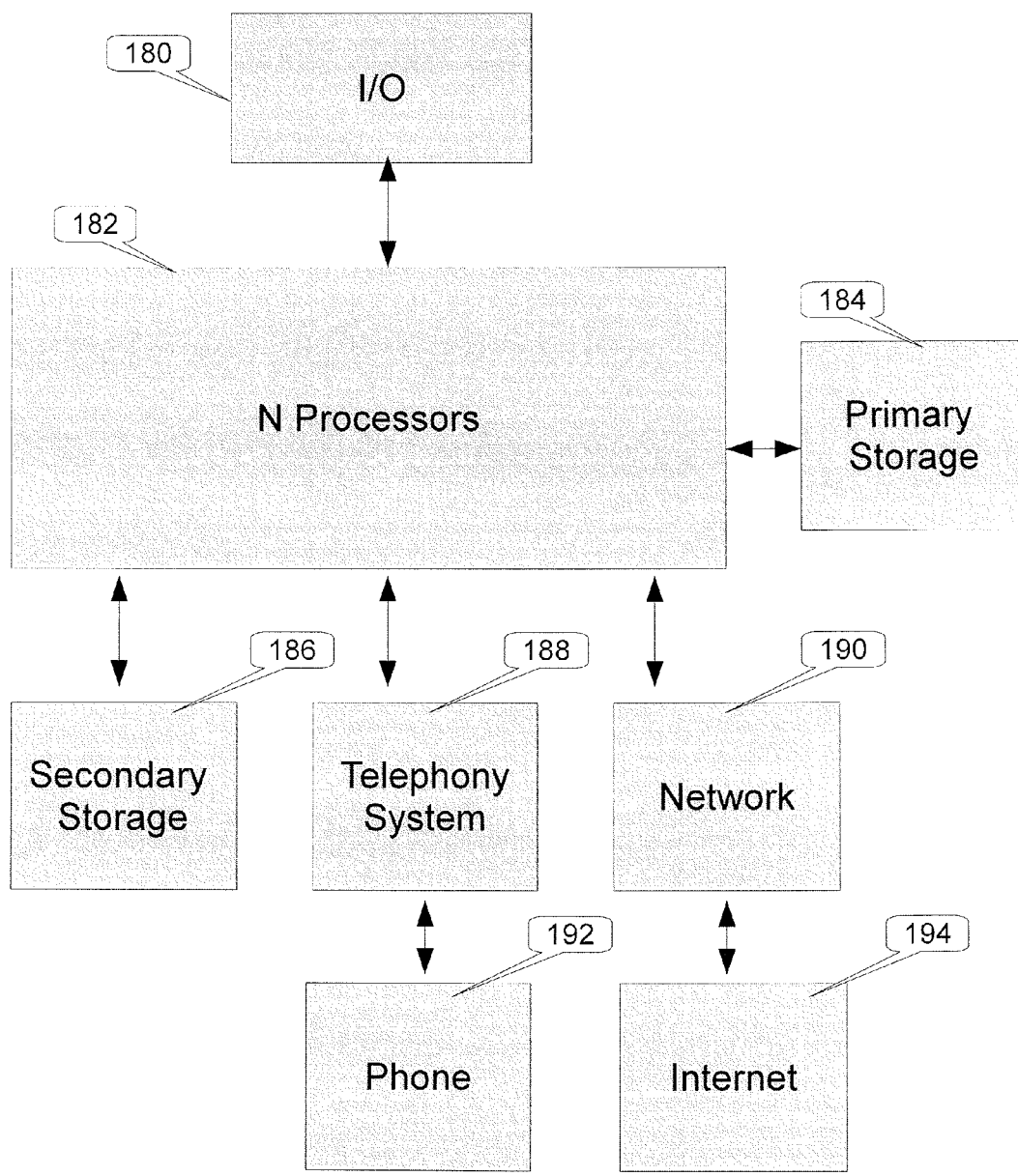
FIG. 6 is a block diagram showing a computer system utilized by the present invention.

FIG. 1 is a flow diagram illustrating the overall system and process of hiring a candidate for a position offered by the client. The present invention establishes a database listing a number of candidates and assessments and evaluations of each candidate based upon various skills or profiles. This database does not include a list of clients or employment opportunities that a candidate would search. Therefore, when a client wishes to utilize the database of the present invention in the hiring process 10, at Step 12, the client would enter various candidate search criteria regarding a particular job opportunity. The criteria would include but is not limited to a position skill, a rating range based upon the candidate's assessment or evaluation as well as other criteria, such as work eligibility, health status and salary expectation. The present invention at Step 14 would conduct a search through its database to locate an appropriate candidate. As will be subsequently explained, each of the candidates would be rated by at least one assessor and possibly an evaluator. Additionally, although not required, information relating to whether a candidate employed the use of a mentor could also be a basis for the candidate's search. The system at Step 16 would display a candidate's profile which would include various factors such as the candidate's skill levels, type of position of interest to the candidate as well as a salary range. Additionally, this system would provide the client with the actual assessment artifacts and recording of an assessment session between the assessor and the candidate which resulted in the candidate's rating by the assessor. This recording is then accessed by the client at Step 18.

Based upon the information provided to the client at Steps 16 and 18, the client has the option of choosing one or more candidates as well as requiring additional assessments to be made on one or more skill levels by an additional assessor at Step 20. The client himself would then proceed to Step 22 or would utilize a client's account manager to actually choose or limit the candidates initially chosen at Step 20. If the client requested further assessment, these assessments would be scheduled at Step 26.

Each candidate at Step 28 is informed of a client's interest. If the client requested additional assessments, these assessments would also be scheduled at Step 28. Once this occurs, any additional assessments at Step 32 would be conducted and the results would then be sent to the client or the client's account manager. Based upon all of the information that was now provided to the client, a choice of a candidate or candidates will be made at Step 34. As will be subsequently explained, once this choice is made, the client would then determine whether a contract facilitator to negotiate an employment contract with a potential employee would be needed at Step 36. If this is not the case, the client would begin their own negotiations with the chosen candidate or candidates. However, if a contract facilitator is needed, the client or the client's account manager would be given a choice of the contract facilitator(s) at Step 38. Step 40 would notify the client or the client's account manager of the chosen contract facilitators and the particular parameters of the contract to be negotiated. The particular contract facilitators along with the terms of the contract would be sent to the candidate at Step 42. The candidate at Step 42 would then choose a particular contract facilitator at Step 42 and negotiations between the candidate, the client or the client's contract facilitator would be consummated at Step 44. The use of the client's account manager and contract facilitator will be subsequently discussed in more detail.

FIG. 2 illustrates the manner in which a candidate would provide information to be stored in the system used for a client to evaluate the candidate's attributes for a particular position. It is important to note that the information entered by the candidate as well as skill levels assessed or evaluated are not based upon a particular client or position. This information is stored in the system to be subsequently accessed by a client. To this end, the candidate would enter profile information that the candidate would believe would be relevant to the hiring process. This information would include, but is not limited to various skills and expertise exhibited by the client. It is important to note that this information does not necessarily include the type of position of which the client is interested. Although the candidates might enter a number of skills in Step 50, Step 52 requires that the candidates specify which of these skills should be assessed.

The assessment process at Step 54 is initiated by the candidate at Step 56 which could include the candidate's schedule for being set. The system at Step 58 would provide the candidate with the schedule as well as attributes of a number of anonymous assessors. The candidate at Step 60 would then choose one or more assessors and a schedule of times to be assessed. If more than one assessor is chosen by the candidate, the candidate is presented to each of these assessors. Each of the assessors would then indicate whether they have the ability and interest to schedule an assessment with the candidate at Step 64. Based upon various factors such as the type of skills to be assessed, the type of assessor as well as the type of candidate, the system at Step 66 would present to the candidate the assessor which is the best match. The system at Step 68 would then schedule an assessment between the assessor and the candidate. These assessments are generally based upon a telephonic or internet-based conference between the assessor and the candidate at Step 70. Both the assessor and the candidate remain anonymous during the course of this conference. As will be subsequently explained in more details, an assessment facilitator would be used to help arrange the assessment.

The conference could take the form of a telephone interview or an internet-based interview. Based upon this interview, the assessor would rate the candidate based upon one or more skills and the assessor would enter his or her comments. The rating as well as the comments provided by the assessor would be reviewed by the candidate at Step 74. If the candidate does not refute the assessment at Step 76, the assessment ends and the assessment including the recording of the conference as well as the rating and the assessor's comments would be sent to the system at Step 78. If the candidate does not dispute the assessment, the candidate still has the option of disabling the publication of the assessment at Step 80 or sometime later. At this point, the assessor would be notified that the assessment while not being disputed would not be included in the system.

If the candidate does dispute the assessment, the candidate will be provided with a list of anonymous evaluators at Step 84. Similar to the candidate being provided with the assessor's profiles a Step 58, the candidate at Step 84 would be provided with the profiles of each of the evaluators. The candidates at Step 86 would choose each of the evaluators in order of preference. The system at Step 88 would then arrange for the evaluator to review the initial conference between the candidate and the assessor as well as the rating provided by the assessor. If the evaluator's evaluation does not concur with the candidate's disputed claim, the candidate at Step 92 is notified. In this context, the candidate also has the right to remove the assessor's rating from the database.

However, if the evaluator at Step 90 agrees with the candidate's disputed claim, the assessor's rating input as well as conference would be erased at Step 94. At this point, the evaluator does have the ability to re-rate the candidate at Step 96 based on the recording of the assessment being disputed. If this does not occur, the candidate is notified at Step 102 and the assessment process is re-initiated. The candidate can then reinstitute the assessment process at Step 56.

If the evaluator does re-rate the candidate at Step 96, the evaluator would then provide the candidate with its rating at Step 98. At this point, the assessment process would end at Step 100.

FIG. 3 illustrates in additional detail how the assessor setup process is implemented. Initially, at Step 110, information relating to each potential assessor is entered into the system. This information would include but is not limited to various skills and expertise exhibited by the potential assessor as well as a pay schedule. The potential assessor at Step 112 would be allowed to choose the assessment facilitator. The system treats the potential assessor as a candidate in the context of the FIG. 3. Based upon information provided by the candidate, the system at Step 114 would provide the candidate with information relating to suggested assessors. Based upon this information, the candidate would choose one or more assessors at Step 116. Information relating to a candidate is transmitted to each of the chosen assessors at Step 118. Step 120 would then indicate whether one or more assessors would be interested in assessing that particular candidate. Based upon the assessors who agreed to assess a particular candidate, the system at Step 122 would match a particular assessor to the candidate. The system would then schedule an assessment to be made at Step 124 and would record the assessment conference at Step 126. The assessor would then rate the candidate at Step 128. If the candidate meets the assessor's standards at Step 130, the system would approve the assessor's role at Step 132 and the appropriate notifications are sent at Step 134. If the candidate does not meet the assessor's standards at Step 130, the system at Step 134 would send appropriate notifications to the candidate.

FIG. 4 illustrates the manner in which the evaluator setup process is implemented. It is noted that this process is similar in many respects to the manner in which the assessment is conducted as illustrated in FIG. 3. The potential evaluator at Step 140 would provide the system with information relating to the potential evaluator's skills and expertise. Step 142 would allow the potential evaluator to choose an assessment facilitator. The system treats the potential evaluator as a candidate in the context of the FIG. 4. Based upon information provided by the potential evaluator, the system at Step 146 would provide the potential evaluator with information relating to suggested assessors. The potential evaluator at Step 148 would choose one or more of the assessors. The system at Step 150 would present the potential evaluator to the assessors chosen. Each assessor at Step 152 would indicate whether they are interested or not in evaluating that particular potential evaluator. Assuming that several assessors show interest in evaluating the potential evaluator, the system would provide a best match between the potential evaluator and one of the assessors at Step 154. At this point, the system at Step 156 would schedule the assessment and would record the assessment and ratings generated by the assessor at Steps 158 and 160. If the candidate meets the evaluator's role standards at Step 162, the system at Step 164 would approve the evaluator role and at Step 166, appropriate notifications would be generated. If the potential evaluator does not meet the assessor's role standards at Step 162, appropriate notifications would be generated at Step 166.

Although the present invention is utilized to allow a client to hire a candidate to fill a particular position, another purpose of the present invention is to assist in a candidate improving his or her skill levels, thereby making that candidate more attractive to a respective client. Regardless of whether a candidate would agree or disagree with a relatively low assessment rating for a particular skill or skills, the present system would allow the candidate to improve those skills. This is accomplished by encouraging the candidate to be mentored. This feature is implemented by having a number of mentors registered in the system in a manner in which assessors and evaluators were included in the database of the present invention. The mentors would provide the system with information relating to their levels of expertise and skill levels. The candidate would then be offered the opportunity to utilize the system to be mentored in one or more skills. Once the candidate would enter the skills to be mentored, the system would search its database and provide the candidate with one or more names as well as skill levels and expertise of the mentors. The candidate would then choose a mentor to help develop the candidate's skill levels. Once the candidate is satisfied that a particular skill level or skill levels have been improved, the candidate would then request that they be assessed for either a new skill level or whether their skill level has been improved subsequent to a previous assessment. In this manner, the candidates would make themselves more attractive to a perspective client.

As shown in FIG. 5, the present system can assist the candidates with career guidance. For example, the system would include an algorithm for reviewing all of the candidates hired by the client. The system would review the skills and skill levels of these hirees and compare them with the skill levels of other candidates. Additionally, at Step 170 the system can determine career paths based upon the skills that a successful candidate possesses. The system at Step 172 would analyze the gap between candidates looking for employment and hired candidates and would suggest various training levels as well as academic degrees to which the candidate should thrive. This is accomplished by analyzing both external and internal data at Step 174. The system would then create career guide path(s) for those individuals which might also include the use of a mentor.

The system of the present invention would also utilize various additional personnel to assist in the hiring process. The system would utilize a legal service provider to determine whether a potential candidate could be employed by a particular client or situation. For example, a client's position might require the candidate to possess a certain level of security or a predetermination that a candidate is clearable. The legal service provider can facilitate the candidate obtaining the proper level of security or an assessment to indicate that the candidate can be, possibly, cleared.

Additionally, a client might require that a proposed or hired candidate be subjected to a medical examination. Therefore, the present invention contemplates the use of a medical evaluator to conduct and/or review the results of the medical examination.

The present invention also envisions the use of a training provider to be utilized by a candidate to improve skills by training or when a client hires a particular candidate for the purpose of training that candidate in various procedures relating to the particular job.

The present invention also contemplates the use of an assessment facilitator for assisting in conducting the assessment as well as the evaluation. FIG. 8 illustrates the purpose of the assessment facilitator in more detail. Step 220 indicates that the assessment facilitator would create an organization as well as a user profile. The organization profile contains information about and relating to an organization associated to a user in the system. This information consists, but is not limited to the organization's legal name, address as well as information used to uniquely identify the organization like the company's registration number, tax identification number and country of origin. The user-profile relates to information used to identify a particular user, such as but not limited to the user's name, date of birth, address, social security number, passport number, country of citizenship, voter identification number and tax identification number. The assessment facilitator at Step 222 would define the infrastructure he has to help candidates and assessors in conducting the assessment with the candidate. This infrastructure would include but is not limited to establish an assessment facility which would allow both the audio as well as internet interview to be conducted. The assessment facilitator would also arrange with the assessor and the candidate the location as well as the schedule for the assessment. This would include the assessment facilitator utilizing a computer center to allow the candidate and/or the assessor access to a particular computer. Once the assessment facilitator information is recorded in the system, the system at Step 224 would inform the system's product management of the setup of the assessment facilitator for review and approval of the assessment facilitator. At Step 226, the system would send user guides and presentations to the assessment facilitator.

FIG. 9 discusses the attributes of the client manager. The client manager at Step 230 would create an organization and user profile used by the system containing similar information as described with respect to the assessment facilitator. At Step 232, the client account manager creates profiles of users who would be the client hiring managers and who are the individuals who would review information relating to candidates, such as but not limited to assessments and evaluations of the candidate as well as the candidate's ratings. The system at Step 234 would send a notification to the system's product management as well as sending user guides and presentations to all new users of the client at Step 236.

FIG. 10 discusses the attributes of the contract facilitator. Similar to the client manager as well as the assessment facilitator, the contract facilitator at Step 240 would create organization and user profiles to a contract facilitator account manager. The contact facilitator account manager would pick client accounts by searching client's codes provided by the client. The system would then send notification to the client account manager for approval at Step 244. The contract facilitator account manager would create profiles of users at Step 246 and then the system would send user guides and presentations to all new users of the contract facilitator at Step 248. The system at Step 250 would send notifications to system's product management.

FIG. 6 illustrates a block diagram showing the computer system utilized by the present invention. The core of the present system utilizes one or more server processors 182 for manipulating the information into the system. Information relating to the candidate's skill level and profile, job positions offered by the client as well as information relating to the assessors, evaluators and any other entity employed in facilitating the operation of the system would generally be entered utilizing the internet 194. A typical network connection and related hardware and software infrastructure 190 would be provided between the internet and the processors 182. This information would be stored within one or more storage facilities, such as a primary storage 184 and a secondary storage 186. Input/Output (I/O) devices at 180 is used to maintain the applications used and built to run the system of the present invention.

The assessments are conducted between candidates and assessors and the evaluations are conducted between a recording of the candidate's assessment and an evaluator. The assessment is generally conducted between the assessor and the candidate employing a telephone 192 connected to a telephony system 188 or over the internet 194 connected to the network system 190. This would allow the assessment, evaluation as well as the ratings developed through the assessment and evaluation to be stored in the storage units 184, 186 after being processed by the processor or processors 182.

Figure 7:
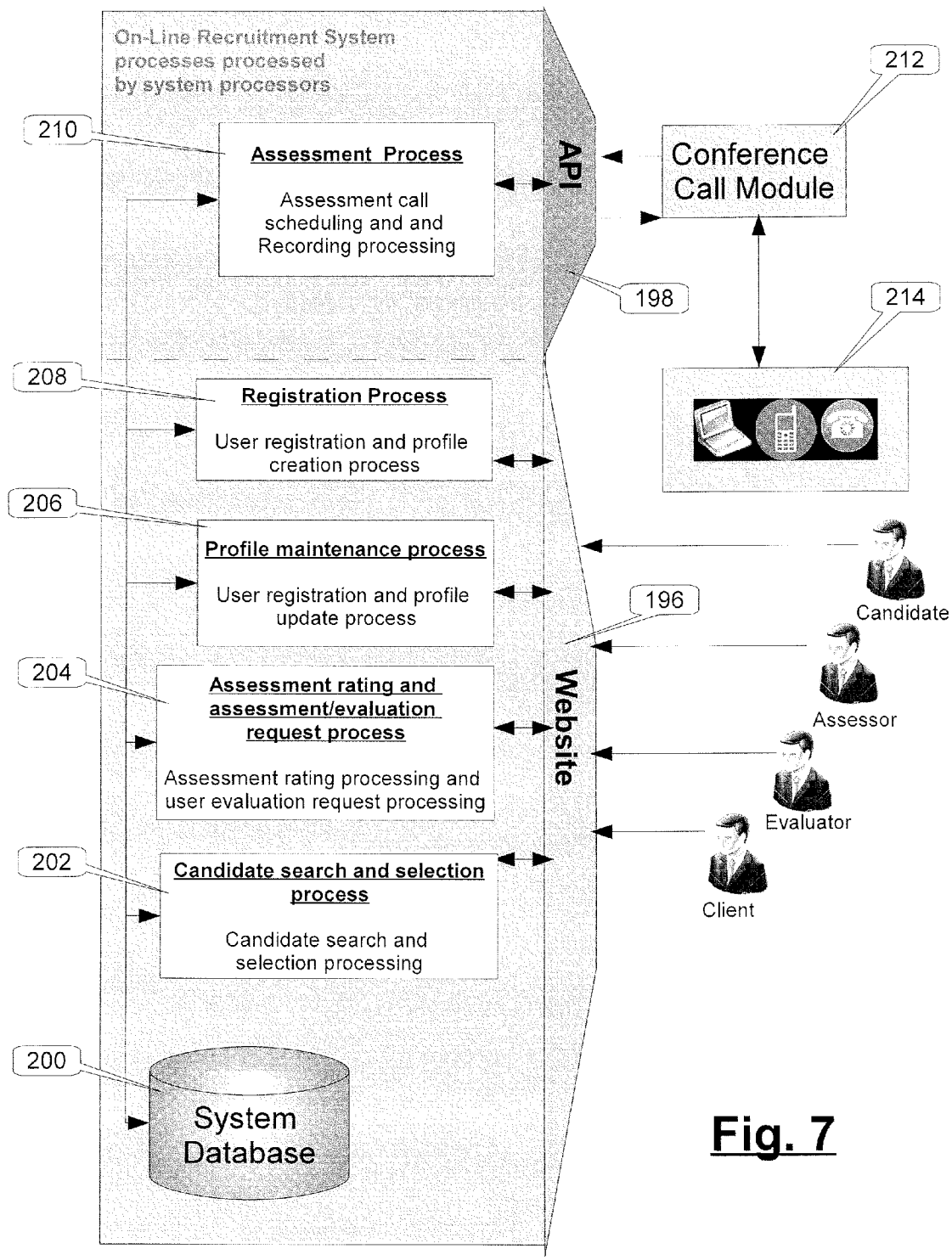
FIG. 7 is a block diagram summarizing the recruitment process.

FIG. 7 summarizes the descriptions of the present invention by providing a website 196 as well as an application programming interface 198 allowing information to be entered into the system database 200 of the present invention, as well as allowing relevant personnel, such as the client, candidate, assessor and evaluator to enter and review information transmitted to the system database 200.

The present invention employs a website allowing the candidate to register his or her profile, contact information and a recitation of his or her skills at Step 208. The candidate also has the ability, through the website 196 to alter his or her profile at Step 206 by including additional skills, updating profile information as well as indicating whether a mentor has been utilized.

The assessment, as previously described, will be conducted between an anonymous assessor and the candidate and the evaluation, as previously described, will be conducted between an anonymous evaluator and a recording of a candidate's assessment. This assessment process 210 is generally conducted by various methods, such as a telephone interview or utilizing a computer to conduct the interview between the candidates and the assessor shown at Step 214. Any conference call module 212 will be utilized between the candidates on one end and the assessor on the other end. The assessment scheduling as well as recording the assessment will be provided between the conference call module 212 and the application programming interface 198. Additionally, the assessment rating and evaluation rating will be entered into the system at Step 204. The client would then have the ability to access the website 196 for the purpose of conducting a candidate search and selection process for a particular employment position. The client would have the ability of entering various criteria in the website to generate a list of candidates.

It should be understood that the program, processes or methods described herein are not related or limited to any particular type of computer apparatus. Various types of general purpose or specialized computer apparatuses may be used with or perform operations in accordance with the teachings of the present invention. In view of the many possible embodiments to which the principles of the present invention may be applied, it should be recognized that the detailed embodiments are illustrative only and should not be taken as limiting the scope of the invention.

The invention claimed is:

1. A web based system for providing a list of candidates for an employment position, comprising:
   a server in communication with a web based network;
   a memory in communication with said server;
   a software program provided in said memory for controlling the operation of said server;
   first information entered into said memory through said server in communication with the web based network relating to at least one job candidate's skill level and attributes;
   second information entered into said memory through said server in communication with the web based system assessing the job candidate's skill level, said information including a first rating of at least one skill level of the job candidate and a real time recorded assessment session between the job candidate and an assessor, said first rating and said recorded assessment entered into said memory, said first rating and said recorded assessment generated irrespective of any employment position; and
   third information entered into said memory by an evaluator evaluating the skill level of the job candidate and said recorded assessment, said third information further including a second rating based upon the skill level of the job candidate and said recorded assessment, and software program configured to derive a third rating from said first and second rating and;
   fourth information provided in said memory listing a plurality of assessors and attributes of said assessors, each of said assessors used to assess a skill level of at least one candidate and provide said recorded assessment; wherein each of said job candidates chooses one of said assessors to interview a job candidate and
   a means in communication with said server allowing a potential employer to conduct a search of said memory to generate a list of candidates based upon at least one of said skill levels, said third rating and said recorded assessment.

2. The web based network system in accordance with claim 1, further including fifth information in said memory listing a plurality of evaluators and attributes of said evaluators, each of said evaluators used to evaluate said skill level of at least one job candidate and said recorded assessment.

3. The web based network system in accordance with claim 1, further including sixth information provided in said memory listing a plurality of mentors and attributes of said mentors, as each of said mentors used by said at least one job candidate to improve at least one skill level of said at least one candidate.

4. The web based network system in accordance with claim 1, wherein said software program analyzes information provided in said memory relating to previous successful job candidates who obtained employment to provide said at least one job candidate with career guidance relating to the improvement of at least one of skill level of said at least one job candidate.

5. A web based network method for providing at least one candidate for an employment position, comprising the steps of:
   providing a server in communication with a web based network provided with a memory for storing an operating software program and storage locations for storing various information relating to providing at least one candidate for the employment position;
   registering a plurality of job candidates in said memory including listing at least one skill level for each of said job candidate;
   including a list of assessors and their attributes in said memory;
   providing a list of assessors and their attributes to each of said job candidates;
   and each of said job candidates choosing one or more of said assessors to assess at least one skill level of each respective job candidate;
   assessing at least one skill level of each of said job candidates by an the assessor;
   providing a first rating of each of said job candidates based upon said assessing step, said rating entered into said memory, said first rating determined irrespective of any employment opportunity;
   entering into said memory a real time recorded assessment session between each of said job candidates and the assessor
   providing a second rating of each of said job candidates based upon an evaluation by an evaluator of at least one skill level for each of said job candidates and said assessing step, said second rating, and entering said third rating into said memory
   deriving a third rating using operating software program based upon said first and second ratings, and entering said third rating into said memory
   allowing a potential employer to search the information entered into said memory by said registering step as well as said assessing step; and said third rating; and
   providing a list of potential job candidates to said potential employer based upon said allowing step.

6. The method in accordance with claim 5, including the steps of: including a list of evaluators and their attributes in said memory; each of said job candidates reviewing said rating and said recorded assessment; and choosing one of said evaluators to review said rating and said recorded assessment.

7. The method in accordance with claim 5, including the steps of: utilizing said operating software program to analyze the skill levels of previous successful candidates who obtained employment with a particular employer; and comparing the skill level of at one of said job candidates with the skill levels of the successful candidates using said operating software program.

* * * * *